Figure 3:
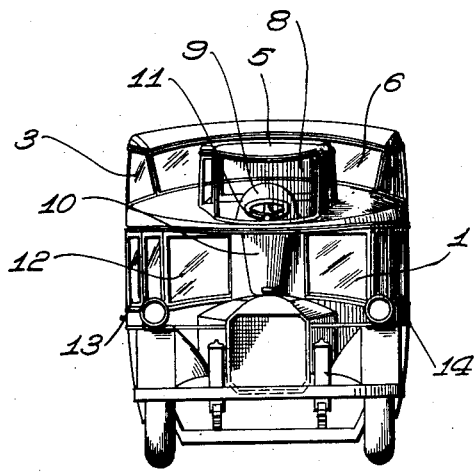

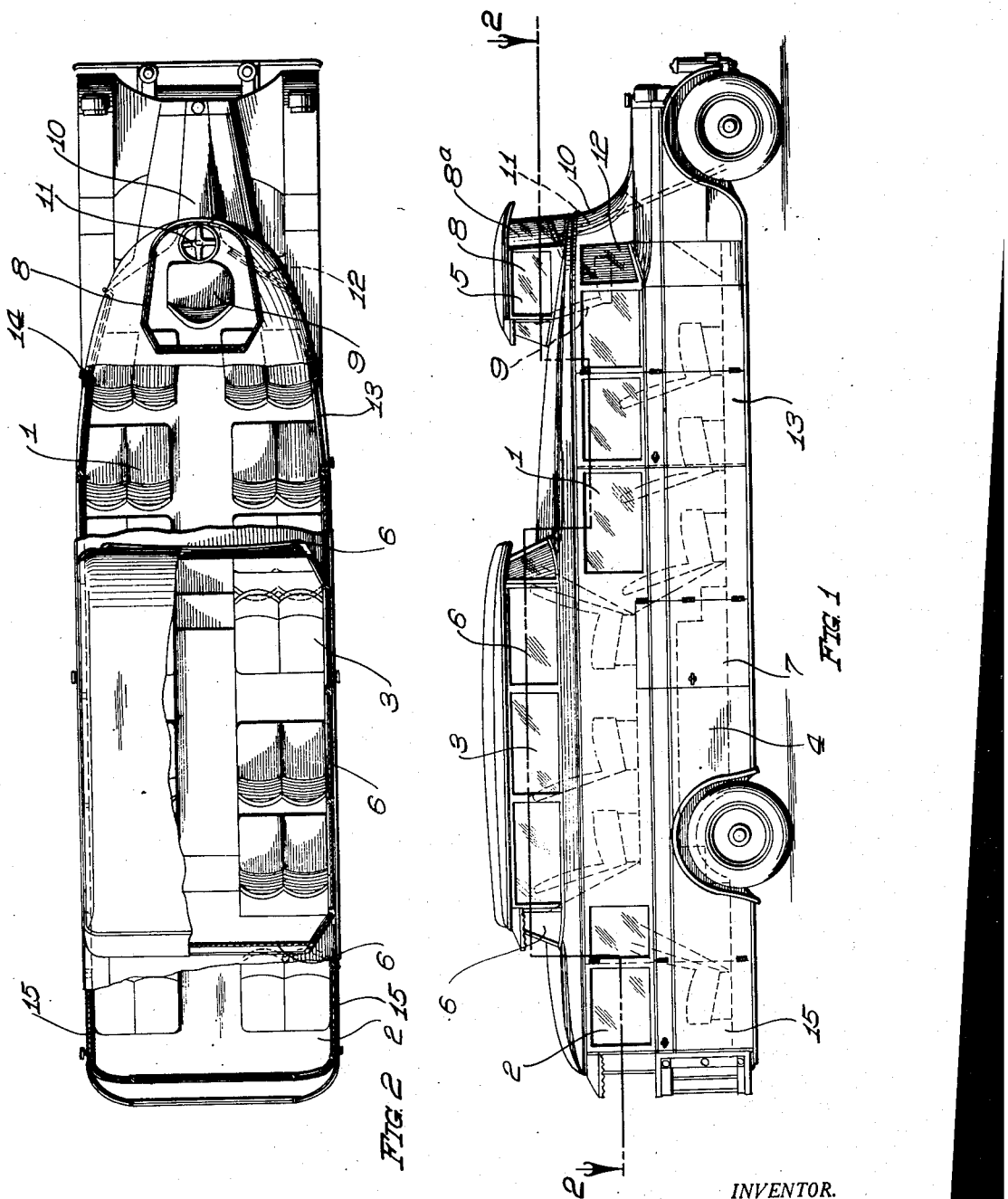

March 21, 1933.  D. E. AUSTIN  1,902,607

AUTOMOBILE STAGE BODY

Filed May 7, 1927  2 Sheets-Sheet 2

INVENTOR.
DWIGHT E. AUSTIN
BY A.B. Bowman
ATTORNEY

Patented Mar. 21, 1933

1,902,607

UNITED STATES PATENT OFFICE

DWIGHT E. AUSTIN, OF LOS ANGELES, CALIFORNIA

AUTOMOBILE STAGE BODY

Application filed May 7, 1927. Serial No. 189,705.

My invention relates to automobile bodies, more particularly to bodies of automobile stages and buses serving as common carriers.

The objects of my present invention are: first, to provide a novel construction and arrangement for automobile bodies which provides particularly large passenger seating space and baggage storage space; second, to provide a body for automobile stages or buses, having a passenger compartment elevated above a lower passenger compartment, for observation purposes, the windows of the elevated passenger compartment being positioned above the top of the lower passenger compartment; third, to provide a body of this class in which the space below the elevated passenger compartment provides a spacious compartment for storing baggage and the like; fourth, to provide an automobile body of this class in which the floor level of the elevated passenger compartment is positioned between the floor level and the top of the lower passage compartment and which communicates directly with the latter; fifth, to provide a body for automobile stages or buses which is provided with a forward passenger compartment, an observation compartment at the rear of the body, and an elevated passenger compartment intermediate the former and elevated above the top or roof portions thereof so that a large field of vision may be had around all sides of the latter compartment and from a higher level than is ordinarily obtainable from lower passenger compartments of automobile stages or buses; sixth, to provide an automobile body having a pilot house or driver's compartment at the forward portion thereof, which pilot house or driver's compartment is elevated a considerable distance from the passenger compartments thereof so that a large field of vision may be had around all sides by the driver, whereby the driver of the vehicle may look over the tops of the vehicles ahead, whereby the sight of the driver is dimmed less by glaring headlights approaching from in front, and whereby the driver may have clearer vision in case of fog; seventh, to provide an automobile body having an elevated passenger observation compartment and a driver's compartment on substantially the same level as the elevated passenger compartment so that the driver may more easily determine whether the elevated passenger compartment will clear trees or other low obstructions above the roadway; eighth, to provide an automobile body of this class whereby entrance and exit may be made to and from the several compartments from one to the other and from the same door in the side of the body; ninth, to provide a body of this class for automobile stages and buses which, by reason of the elevated passenger observation compartment and the elevated driver's compartment, provides considerably more seating space for passengers; tenth, to provide, as a whole, a novelly constructed and arranged body for automobile stages and buses; and, eleventh, to provide a body of this class which is simple and economical of construction, durable, and which will not readily deteriorate.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a side elevational view of my new automobile body in its preferred form of construction; Fig. 2 is a partial plan and partial sectional view thereof taken on the line 2—2 of Fig. 1, certain parts and portions above the section line being shown in plan to facilitate the illustration; and, Fig. 3 is a front elevational view thereof.

Like characters of reference refer to similar parts and portions throughout the several views of the drawings.

My automobile body, for stages, buses, or the like, as shown in the preferred form of construction in the drawings, is divided primarily into five compartments, namely, the forward passenger compartment 1, the rear passenger compartment 2, the intermediate, elevated, passenger observation compartment 3, the storage compartment 4, and the pilot house or driver's compartment 5. The compartment 1 is positioned between the front and rear wheels of the vehicle and the rear compartment 2 behind the rear wheels. By reason of the position of the compartments 1 and 2 relative to the wheels, the floor levels thereof may be lower than that of automobile stages and buses now in use. The compartments 1 and 2 are preferably on the same level, and the top or roof portions thereof are also substantially on the same level so as to provide a straight line construction for the body.

The floor level of the compartment 3, positioned intermediate the forward compartment 1 and the rear compartment 2, is raised a considerable distance above the floor levels of the latter and connected with the latter by suitable stairs at the forward and rear ends of the intermediate compartment 3. The top or roof portion of the compartment 3 is separate and apart from and elevated above the tops of the compartments 1 and 2. The lateral side walls and the forward and rear ends of the compartment 3 are provided with transparent panels or windows 6 which are positioned above or extend above the normal top or roof level of the compartments 1 and 2, so as to provide unobstructed vision around and at all sides of the compartment 3, thus providing a convenient and desirable observation compartment in the body.

It will be noted that the forward and rear ends of the compartment 3 communicate directly with the forward passenger compartment 1 and the rear compartment 2, thus providing a substantially continuous passenger compartment for the vehicle. It will also be noted that by elevating a portion of the passenger seating space above the other, space for more seats is provided, permitting the backs of the seats in the compartment 3 to extend over or closer to, the seats or the backs of the seats, in the lower compartments.

The space, designated 4, below the elevated or intermediate passenger compartment 3, is considerably larger than storage compartments in other similar vehicles for the storage of baggage and the like, and the storage of baggage in the compartment 4 does not obstruct the field of vision of any of the passenger compartments in any way, and further, the baggage stored in the compartment 4 cannot be lost. The body is provided with doors 7 at its opposite sides to permit access to the storage compartment, as shown in Figs. 1 and 2.

In the rear passenger compartment, the aisle, which in this instance is a central aisle, is positioned one or two normal step rises below the floor level on which the seats in the rear compartment are supported, the latter portions of the floor forming seat supporting platforms elevated above the aisle, as shown in the drawings. This arrangement provides greater head room above the aisle then over the seats, and greater storage space below than if the seats were supported on a portion of floor on a level with the aisle. The lower construction of the aisle also forms a partial partition within the storage or baggage compartment to prevent, to a large extent, lateral shifting of the baggage when making turns rapidly or under other circumstances.

The pilot house, or driver's compartment 5, is positioned at the central portion of the body at the forward end of the forward passenger compartment 1 and is extended above the top thereof to substantially the height of the compartment 3. The side walls of the driver's compartment 5 are also provided with transparent panels or windows 8 above the top or roof portion of the compartment 1. The forward panel or windshield portion 8a of the driver's compartment is preferably curved, as shown best in Figs. 1 and 2, to provide an unobstructed field of vision ahead and a considerable distance around to the sides. The forward end of the driver's compartment may be positioned a slight distance forwardly of the forward end of the compartment 1, as shown, so as to provide greater space at the forward end of the compartment 1, it being noted that the seat 9 of the driver extends below the top of the compartment 1 and into the forward portion thereof. The forward portion of the driver's compartment merges with the hood portion of the body by a stream-lined cowling 10, which cowling encloses the steering post 11 which extends into the driver's compartment. The positioning of the driver's compartment, as shown and described, and the elevation of the driver's seat and the forward positioning of the same, adds considerable seating space to the forward end of the forward compartment 1 and also provides a less unobstructed field of vision forwardly through the angularly positioned windows or windshields 12 which connect the sides of the body which the rear portions of the cowling 10.

The positioning of the driver's compartment, as shown and described, permits clear vision ahead and to the sides, as well as to the rear through the compartment 3, and also gives an elevated point of observation so that the driver may see a great distance ahead, above vehicles in front, as well as clear vision in case of fogs.

The passenger compartment is preferably provided with doors 13 and 14 at its opposite sides, the latter, at one side, being positioned forwardly of the former at the opposite side. The door 13 permits more ready access to the several compartments while the door 14 permits more direct entrance to the forward seats in the compartment 1. The rear compartment 2 is also preferably provided with doors 15, as shown.

Thus there is provided a body for automobile stages, buses, or the like, which provides a large seating capacity and storage space, novelly arranged observation compartment and a novelly arranged driver's compartment in connection therewith as aimed at and set forth in the objects of the invention; and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an automobile stage body, the combination with a stage body having entrance and exit means at its opposite ends, an aisle connecting said entrance and exit means for continuous passage therebetween, the intermediate portion of the aisle being raised above the floor portions within the body immediately adjacent said entrance and exit means, of seat compartments arranged on different levels adjacent the aisle, seats in said compartments, the floor levels of the seat compartments on the lower level being substantially on the level with the floor portions adjacent said entrance and exit means, and the floor levels of the seat compartments on the higher level being positioned above the raised portion of the aisle and communicating therewith.

2. In an automobile stage body, the combination with a stage body having entrance and exit means at its opposite ends, an aisle connecting said entrance and exit means for continuous passage therebetween, the intermediate portion of the aisle being raised above the lower floor level of the body, of seat compartments arranged on different levels, seats in said compartments at the side of the aisle, the floor levels of the seat compartments on the lower level being substantially on the level with the floor level of the body, and the floor levels of the seat compartments on the higher level being positioned above the raised portion of the aisle and communicating therewith.

In testimony whereof, I have hereunto set my hand at Los Angeles, California this 18th day of April 1927.

DWIGHT E. AUSTIN.